US009987938B2

(12) United States Patent
    Salasoo

(10) Patent No.: US 9,987,938 B2
(45) Date of Patent: Jun. 5, 2018

(54) ENERGY STORAGE DEVICE, EXCHANGE APPARATUS, AND METHOD FOR EXCHANGING AN ENERGY STORAGE DEVICE

(71) Applicant: General Electric Company, Schenectady, NY (US)

(72) Inventor: Lembit Salasoo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 14/959,424

(22) Filed: Dec. 4, 2015

(65) Prior Publication Data
    US 2017/0158070 A1    Jun. 8, 2017

(51) Int. Cl.
    *H02J 7/00*   (2006.01)
    *B60L 11/18*  (2006.01)
    (Continued)

(52) U.S. Cl.
    CPC ....... *B60L 11/1822* (2013.01); *H01M 2/1083* (2013.01); *H01M 10/4207* (2013.01); (Continued)

(58) Field of Classification Search
    CPC .. B60L 11/1822; B60S 5/06; B64C 2201/027; B64C 2201/042;
    (Continued)

(56) References Cited

U.S. PATENT DOCUMENTS 3,785,514 A * 1/1974 Forsyth .................... B60P 3/07
                                                      410/1
3,790,816 A    2/1974 Berman
(Continued)

FOREIGN PATENT DOCUMENTS

CA       2784670 A1    7/2011
CN     102420447 A     4/2012
(Continued)

OTHER PUBLICATIONS

Yarlagadda et al., "A Battery Management System Using an Active Charge Equalization Technique Based on DC-DC Converter Topology", Thesis, Master of Science in Engineering, University of Akron, pp. 1-143, Aug. 2011.
(Continued)

*Primary Examiner* — Helen Rossoshek
(74) *Attorney, Agent, or Firm* — GE Global Patent Operation; John A. Kramer

(57) ABSTRACT

A battery exchange apparatus (e.g., for a battery exchange station positioned at a wayside location of a vehicle route) includes a receptacle mounted to at least one rail for lateral movement along the rail and for pivotal movement around a working axis generally orthogonal to the rail. The receptacle has an open end for receiving a battery from a direction generally orthogonal to the working axis. The apparatus further includes a recharge connector provided within the receptacle and opposite the open end of the receptacle. The open end of the receptacle includes at least two laterally flared surfaces, which are configured to impose at least one of lateral motion or pivotal motion on the receptacle in order to align the receptacle to the battery that is at least one of laterally or angularly misaligned from a lateral midline of the receptacle.

14 Claims, 7 Drawing Sheets

(51) Int. Cl.
    *H01M 10/46* (2006.01)
    *H01M 10/42* (2006.01)
    *H01M 2/10* (2006.01)
(52) U.S. Cl.
    CPC ............ *H01M 10/46* (2013.01); *H02J 7/0045* (2013.01); *B64C 2201/027* (2013.01); *B64C 2201/042* (2013.01); *B64C 2201/208* (2013.01); *H01M 2220/20* (2013.01)
(58) Field of Classification Search
    CPC ............ B64C 2201/208; H01M 10/46; H01M 10/4207; H01M 2220/20; H01M 2/1083; H02J 7/0045
    See application file for complete search history.

(56) References Cited

U.S. PATENT DOCUMENTS

| | | | |
|---|---|---|---|
| 3,847,085 A * | 11/1974 | Rypinski | B61B 15/00 104/122 |
| 3,880,299 A * | 4/1975 | Zollinger | B65G 1/0414 104/48 |
| 4,102,273 A | 7/1978 | Merkle et al. | |
| 4,272,716 A | 6/1981 | Etienne | |
| 4,342,533 A | 8/1982 | Hane | |
| 4,983,903 A | 1/1991 | Bae et al. | |
| 5,091,687 A | 2/1992 | Meyer et al. | |
| 5,163,537 A | 11/1992 | Radev | |
| 5,318,142 A | 6/1994 | Bates et al. | |
| 5,360,307 A | 11/1994 | Schemm et al. | |
| 5,373,195 A | 12/1994 | De Doncker et al. | |
| 5,425,159 A * | 6/1995 | Kluttermann | B65H 67/0428 104/34 |
| 5,523,666 A * | 6/1996 | Hoelzl | B60K 1/04 320/109 |
| 5,545,967 A | 8/1996 | Osborne et al. | |
| 5,594,318 A | 1/1997 | Nor et al. | |
| 5,612,606 A | 3/1997 | Guimarin et al. | |
| 5,620,057 A | 4/1997 | Klemen et al. | |
| 5,659,237 A | 8/1997 | Divan et al. | |
| 5,659,240 A | 8/1997 | King | |
| 5,764,027 A | 6/1998 | Harvey | |
| 5,898,282 A | 4/1999 | Drozdz et al. | |
| 5,982,143 A | 11/1999 | Stuart | |
| 6,150,795 A | 11/2000 | Kutkut et al. | |
| 6,294,843 B1 | 9/2001 | Kato et al. | |
| 6,380,701 B1 | 4/2002 | Kahlon et al. | |
| 6,390,215 B1 | 5/2002 | Kodama et al. | |
| 6,841,971 B1 | 1/2005 | Spee et al. | |
| 6,973,880 B2 | 12/2005 | Kumar | |
| 7,004,710 B1 | 2/2006 | Quade | |
| 7,053,588 B2 | 5/2006 | Nakanishi et al. | |
| 7,061,131 B2 | 6/2006 | King et al. | |
| 7,448,328 B2 | 11/2008 | Kumar | |
| 7,602,143 B2 | 10/2009 | Capizzo | |
| 7,715,958 B2 | 5/2010 | Kumar | |
| 7,755,322 B2 * | 7/2010 | Raff | H01M 2/1022 320/107 |
| 7,854,203 B2 | 12/2010 | Kumar | |
| 7,893,658 B2 | 2/2011 | Bhardwaj | |
| 8,022,666 B2 | 9/2011 | Li | |
| 8,025,474 B2 | 9/2011 | Springston et al. | |
| 8,047,317 B2 | 11/2011 | Mari Curbelo et al. | |
| 8,063,609 B2 | 11/2011 | Salasoo et al. | |
| 8,089,249 B2 | 1/2012 | Zhang et al. | |
| 8,148,952 B2 | 4/2012 | Schaffnit | |
| 8,253,378 B2 | 8/2012 | Lee et al. | |
| 8,487,582 B2 | 7/2013 | King et al. | |
| 8,643,334 B2 | 2/2014 | Kuo et al. | |
| 8,829,853 B2 | 9/2014 | Hill et al. | |
| 8,890,475 B1 | 11/2014 | Becker | |
| 8,952,662 B2 | 2/2015 | Ma | |
| 9,035,607 B2 | 5/2015 | Lafrance | |
| 9,037,334 B1 | 5/2015 | Cole | |
| 9,142,979 B2 | 9/2015 | Tsai | |
| 9,174,525 B2 | 11/2015 | Caron | |
| 9,225,191 B2 | 12/2015 | Drobnik | |
| 9,290,100 B2 * | 3/2016 | Wisniewski | B60L 11/1809 |
| 2002/0085903 A1 * | 7/2002 | Gagnon | B65G 67/02 414/392 |
| 2002/0145404 A1 | 10/2002 | Dasgupta et al. | |
| 2004/0112320 A1 | 6/2004 | Bolz et al. | |
| 2005/0053451 A1 * | 3/2005 | Gagnon | B65G 67/02 414/400 |
| 2005/0077875 A1 | 4/2005 | Bohley | |
| 2005/0077879 A1 | 4/2005 | Near | |
| 2006/0250902 A1 | 11/2006 | Bender et al. | |
| 2007/0051542 A1 | 3/2007 | Wilks | |
| 2007/0178771 A1 | 8/2007 | Goetz et al. | |
| 2008/0233469 A1 | 9/2008 | Drozdz et al. | |
| 2009/0058355 A1 | 3/2009 | Meyer | |
| 2010/0145717 A1 * | 6/2010 | Hoeltzel | B60K 1/04 705/1.1 |
| 2010/0080030 A1 | 9/2010 | Xue et al. | |
| 2010/0235030 A1 | 9/2010 | Xue et al. | |
| 2011/0044791 A1 | 2/2011 | Agassi et al. | |
| 2011/0074351 A1 * | 3/2011 | Bianco | B60L 11/1816 320/109 |
| 2011/0089898 A1 | 4/2011 | Lee et al. | |
| 2011/0114398 A1 | 5/2011 | Bianco | |
| 2011/0123309 A1 | 5/2011 | Berdelle-Hilge et al. | |
| 2011/0193528 A1 | 8/2011 | Huggins | |
| 2011/0243698 A1 * | 10/2011 | Herold | B66C 19/002 414/562 |
| 2011/0251935 A1 * | 10/2011 | German | B60S 5/06 705/30 |
| 2011/0285352 A1 | 11/2011 | Lim et al. | |
| 2011/0301794 A1 | 12/2011 | Bastien | |
| 2012/0025784 A1 | 2/2012 | Rana | |
| 2012/0032638 A1 | 2/2012 | Jung | |
| 2012/0038216 A1 | 2/2012 | Berry et al. | |
| 2012/0068664 A1 * | 3/2012 | Franzen | B60L 11/18 320/109 |
| 2012/0119709 A1 | 5/2012 | Mull et al. | |
| 2012/0217806 A1 | 8/2012 | Heidenreich et al. | |
| 2012/0262110 A1 | 10/2012 | Soong et al. | |
| 2012/0271723 A1 | 10/2012 | Penilla et al. | |
| 2012/0286733 A1 | 11/2012 | Chang et al. | |
| 2012/0316671 A1 | 12/2012 | Hammerslag et al. | |
| 2013/0015817 A1 | 1/2013 | Wang et al. | |
| 2013/0049698 A1 | 2/2013 | Jung | |
| 2013/0057219 A1 | 3/2013 | Sakata | |
| 2013/0063072 A1 | 3/2013 | Shirasaka et al. | |
| 2013/0138279 A1 | 5/2013 | Shi et al. | |
| 2013/0177795 A1 | 7/2013 | Power et al. | |
| 2013/0214733 A1 | 8/2013 | Liang et al. | |
| 2013/0257145 A1 | 10/2013 | Caldeira et al. | |
| 2013/0282472 A1 | 10/2013 | Penilla et al. | |
| 2013/0323006 A1 * | 12/2013 | Smithson | B60P 3/062 414/812 |
| 2014/0246257 A1 * | 9/2014 | Jacobsen | B62D 37/04 180/14.2 |
| 2014/0266050 A1 | 9/2014 | Biskup | |
| 2015/0033537 A1 | 2/2015 | Poillot et al. | |
| 2015/0137758 A1 * | 5/2015 | Taga | H02J 7/0045 320/112 |
| 2015/0266382 A1 * | 9/2015 | Penmetsa | B60L 1/003 307/10.1 |
| 2016/0190858 A1 * | 6/2016 | Zhang | H02J 7/0045 320/108 |
| 2017/0129603 A1 * | 5/2017 | Raptopoulos | B64C 39/024 |

FOREIGN PATENT DOCUMENTS

| | | |
|---|---|---|
| CN | 102468674 A | 5/2012 |
| CN | 102664433 A | 9/2012 |
| CN | 102882242 A | 1/2013 |

(56) References Cited

FOREIGN PATENT DOCUMENTS

| JP | 04334906 A | 11/1992 |
|---|---|---|
| JP | 2013247854 A | 12/2013 |
| WO | 2010076767 A1 | 7/2010 |
| WO | 2012154990 A2 | 11/2012 |

OTHER PUBLICATIONS

Einhorn et al., "Charge Balancing of Serially Connected Lithium-Ion Battery Cells in Electric Vehicles", E & i Electrical Engineering and Information Technology, pp. 167-173, vol. No. 129, Issue No. 3, May 2012.
U.S. Non-Final Office Action issued in connection with Related U.S. Appl. No. 14/157,700 dated Jul. 24, 2015.
U.S. Non-Final Office Action issued in connection with Related U.S. Appl. No. 14/321,935 dated Feb. 26, 2016.
Chinese Office Action issued in connection with Related CN Application No. 201310331899.0 dated Mar. 2, 2016.
European Search Report and Opinion issued in connection with Related EP Application No. 15194773.6 dated Jul. 7, 2016.
U.S. Non-Final Office Action issued in connection with Related U.S. Appl. No. 14/541,529 dated Jul. 15, 2016.
U.S. Notice of Allowance Office Action issued in connection with Related U.S. Appl. No. 14/321,935 dated Jul. 20, 2016.
U.S. Final Office Action issued in connection with Related U.S. Appl. No. 14/157,700 dated Aug. 4, 2016.
U.S. Notice of Allowance Office Action issued in connection with Related U.S. Appl. No. 14/971,415 dated Oct. 5, 2016.
U.S. Non-Final Office Action issued in connection with Related U.S. Appl. No. 14/699,173 dated Nov. 22, 2016.
U.S. Non-Final Office Action issued in connection with Related U.S. Appl. No. 14/967,967 dated Nov. 25, 2016.
U.S. Non-Final Office Action issued in connection with Related U.S. Appl. No. 14/541,529 dated Jan. 12, 2017.
U.S. Non-Final Office Action issued in connection with Related U.S. Appl. No. 14/541,529 dated Jul. 3, 2017.
U.S. Appl. No. 14/966,723, filed Dec. 11, 2015, Lembit Salasoo.
U.S. Appl. No. 62/154,372, filed Apr. 29, 2015, Lembit Salasoo.
U.S. Appl. No. 14/971,415, filed Dec. 16, 2015, Robert Dean King et al.
U.S. Appl. No. 14/541,529, filed Nov. 14, 2014, Robert Dean King et al.
U.S. Appl. No. 14/967,967, filed Dec. 14, 2015, Zhi Zhou et al.
U.S. Appl. No. 14/157,700, filed Jan. 17, 2014, Ligong Wang et al.
U.S. Appl. No. 14/699,173, filed Apr. 29, 2015, Robert Dean King.
U.S. Appl. No. 14/321,935, filed Jul. 2, 2014, Saijun Mao et al.

\* cited by examiner

ENERGY STORAGE DEVICE, EXCHANGE APPARATUS, AND METHOD FOR EXCHANGING AN ENERGY STORAGE DEVICE

BACKGROUND

Technical Field

Embodiments of the invention relate generally to vehicles powered by stored energy. Particular embodiments relate to the exchange, replacement, or recharging of stored energy devices provided for such vehicles.

Discussion of Art

Generally, zero-emissions vehicles, e.g., vehicles driven by power sources that do not require combustion, are desirable for enhancing cleanliness of air surrounding the pathways traveled by such vehicles. Zero-emissions vehicles are particularly desirable for use in underground mining operations, in which breathable air is a limited and invaluable resource.

Gallery mines can extend as deep as two miles vertically and for many miles horizontally. Although elevators in vertical shafts may be used for lifting ore up from the sub-levels of a mine, and for raising and lowering mine crew personnel, it is prohibitively expensive to put vertical shafts all along a miles-long gallery. Accordingly, vehicles are used to haul the ore and/or mine crew along the galleries to and/or from the extraction shafts. As the extent of a typical gallery mine renders ventilation challenging, it is desirable for such vehicles to have minimal emissions so as to maximize the breathable air available to the mine crew. Presently, some ore haulers are built with engines certified to "Tier 3" emissions standards. However, it would be more desirable to build these hauler vehicles as zero-emissions vehicles (e.g., electric powered) so as to avoid any additional ventilation loading from their operation.

Battery powered vehicles already are available for crew transport within mines. For cost reasons, battery-charging stations can be provided only in selected areas of a mine, typically close to an extraction shaft. Battery powered crew transport vehicles are often able to sit at these charging stations for extended periods given the relative infrequency of crew transport. This relatively high availability for charging enables lower power draw and thereby reduces the equipment and operational costs of recharging battery powered crew transport vehicles. While recharging crew transport vehicles is often practical, recharging other electric mining vehicles, such as an ore-hauler, is potentially problematic.

More specifically, mine operations are budgeted to have ore hauler vehicles in near-continuous motion, pausing only to load and unload. Loading locations are continuously moving as the work face advances or retreats, therefore, it is not feasible to provide for battery charging at loading locations. During unloading, an ore hauler vehicle is subject to large and somewhat unpredictable mechanical loads. Additionally, each ore hauler vehicle is scheduled to clear loading and unloading locations as rapidly as possible so that a next ore hauler can begin to load or dump. But the high capacity batteries essential to powering an ore hauler, which must transport loads far heavier than a few crewmembers, would take a long time to recharge even at relatively high electrical power (e.g., on the order of thousands of watts). For at least this additional reason, loading and unloading locations are not optimal locations for recharging an ore hauler vehicle battery.

Moreover, use of battery powered ore hauler vehicles would require scheduling an additional stop or detour along the haul route to permit for battery recharge in a location away from loading, hauling, and unloading operations. Sidetracking an ore hauler, however, results in excessive time not accomplishing its intended uses of loading, hauling, and unloading. Excessive off-task time has been an obstacle to the adoption of battery powered hauler vehicles, which would otherwise be desirable.

In view of the above, it may be desirable to provide apparatuses and methods for exchanging, replacing, and/or recharging a battery of a zero-emission vehicle, such that it might become feasible to utilize battery powered ore hauler vehicles in underground mines. Such apparatus and methods might also be helpful toward increasing utilization of battery powered crew transporters.

BRIEF DESCRIPTION

In an embodiment, a battery exchange apparatus (e.g., for a battery exchange station positioned at a wayside location of a vehicle route) includes a receptacle mounted to at least one rail for lateral movement along the rail and for pivotal movement around a working axis generally orthogonal to the rail. The receptacle has an open end for receiving a battery from a direction generally orthogonal to the working axis. The apparatus further includes a recharge connector provided within the receptacle and opposite the open end of the receptacle. The open end of the receptacle includes at least two laterally flared surfaces, which are configured to impose at least one of lateral motion or pivotal motion on the receptacle in order to align the receptacle to the battery that is at least one of laterally or angularly misaligned from a lateral midline of the receptacle.

In an embodiment, a vehicle battery includes a casing that is formed as an orthogonal prism or cylinder having first and second opposed and congruent ends joined by at least one side that extends parallel to a line between the ends. The vehicle battery further includes energy storage media housed in the casing, a first power connector attached to the first end of the casing and fully operable to receive power to charge and discharge the battery, and a second power connector attached to the second end of the casing and fully operable to receive power to charge and discharge the battery independent of the first power connector.

In an embodiment, a system (e.g., a battery exchange system) includes a battery interface apparatus for a vehicle, which includes a compartment attached to the vehicle, and a plunger that has a proximal end that is mounted in the compartment, and a distal end that is configured to be actuated to protrude away from the proximal end and that is configured to be actuated to retract toward the proximal end. The battery interface apparatus further includes a platform that is mounted to the distal end of the plunger, a first recharge connector that is mounted on or into the platform (the first recharge connector includes charging connections facing away from the plunger), a flexible power connector that is connected from the first recharge connector to the vehicle for transferring power from the first recharge connector to the vehicle, and a latch that is mounted in the vehicle adjacent a stroke path of the plunger, and which is operable to engage into a latch of a battery that is carried by the platform and operably connected to the first recharge connector. In other embodiments, the system further includes the battery and the wayside battery exchange apparatus as described herein. That is, in embodiments, a system includes a vehicle-side battery exchange portion, a battery, and a wayside battery exchange portion, each of which may be as described in one or more embodiments herein.

In an embodiment, a battery exchange method includes laterally ejecting a depleted or partially-depleted battery from a stored energy vehicle via an ejection mechanism, and guiding a moveable receptacle of a battery exchange apparatus into position to receive the battery. (A base of the battery exchange apparatus on which the receptacle moves is stationary relative to a vehicle route.) The method further includes accepting the battery into the receptacle. The battery and/or are configured such that by ejecting the battery, the receptacle of the battery exchange apparatus is mechanically guided into position to receive the battery.

DRAWINGS

The present invention will be better understood from reading the following description of non-limiting embodiments, with reference to the attached drawings, wherein below:

FIGS. 2A-5C also show aspects of embodiments of a vehicle-side battery interface apparatus.

DETAILED DESCRIPTION

Figure 1:
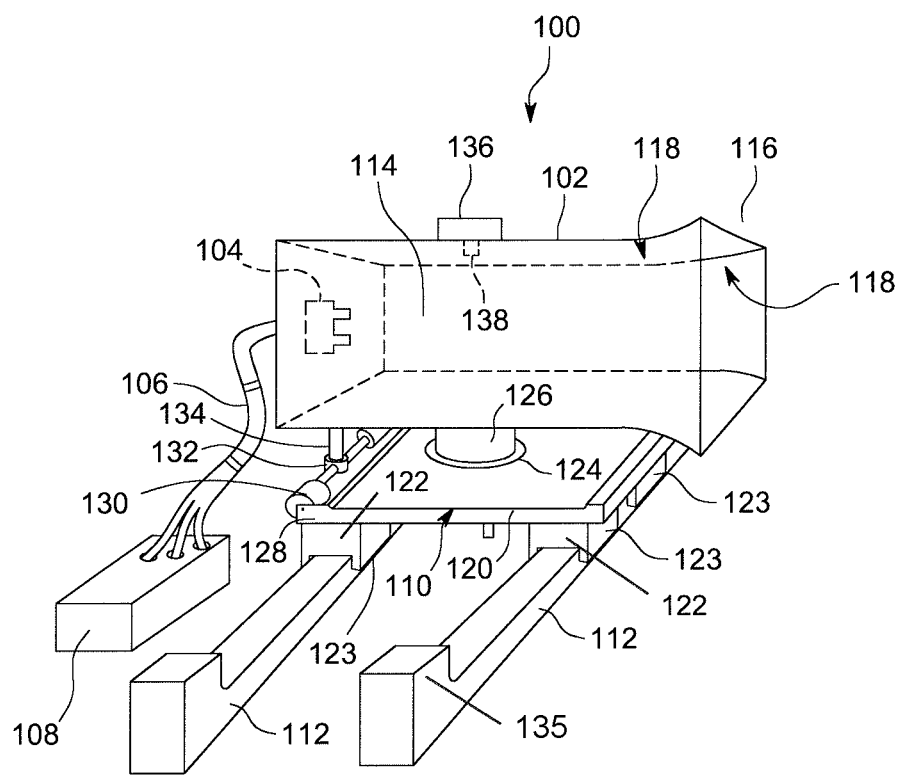
FIG. 1 is a perspective view of a wayside battery exchange apparatus, according to an embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to electrochemical batteries or electrolytic capacitors installed in mining vehicles, embodiments of the invention also are more generally applicable for exchanging and recharging batteries that are installed in movable assets. As used herein, the term "stored energy vehicle" refers to vehicles that, at least in part, utilize a power source that does not require combustion.

Embodiments of the invention are intended to enhance productivity of vehicles that are powered by batteries by reducing the time required for automated battery exchange, recharging, and replacement. As used herein, "batteries" refer generally to energy storage devices such as electrochemical batteries, electrolytic capacitors, capacitors, red/ox canisters, pneumatic cylinders, and the like.

As used herein, the terms "substantially," "generally," and "about" indicate conditions within reasonably achievable manufacturing and assembly tolerances, relative to ideal desired conditions suitable for achieving the functional purpose of a component or assembly.

In an embodiment, as shown in FIG. 1, a battery exchange apparatus 100 includes a receptacle 102, which contains a recharge connector 104. The recharge connector 104 is operatively connected via an energy transfer connector 106 (e.g., one or more flexible conduits, cables, or hoses) to a power supply 108 (e.g., one or more air compressor(s), electrolysis unit(s), electrical generator(s), power converter(s), or public utility electrical power grid or other power grid). Although for convenience of illustration the power supply 108 is shown adjacent to the receptacle 102, the power supply may be disposed at any distance from the receptacle 102 as permitted by a usable length or range of the energy transfer connector 106.

The receptacle 102 is pivotally mounted on a platform 110, which is slidingly mounted onto one or more rail(s) 112. Although illustrated as raised linear rails that protrude upward from a fixed base, the rails 112 could equally serve their intended purpose if formed as linear tracks or channels indented into a fixed base. Indeed, as used herein, "rails" refer generally to structures that constrain the platform 110 to move lateral to an intended direction of presentation of a battery for insertion into the receptacle 102. In some embodiments it may be feasible to provide the rails 112 with an arcuate plan, either convex or concave toward the intended direction of battery presentation.

The receptacle 102 includes a box-like body 114, which has at its closed end the recharge connector 104. The box-like body 114, which may be sized to closely accommodate a battery 300 (shown best in FIG. 6), incorporates at its open end 116 a pair of laterally outward flared surfaces 118 (better seen in FIGS. 2A-5C). One purpose of the flared surfaces 118 is to accommodate insertion of a battery 300 that is laterally and/or angularly misaligned to the receptacle 102, as shown in FIGS. 3A-5C. Although the body 114 and the open end 116 are shown as box-shaped, that is, forming a continuous closed perimeter, the body 114 and/or the open end 116 equally may be tray-shaped, that is, opened toward an upper side.

The platform 110 includes a body 120, which is slidingly mounted by feet 122 onto the rails 112. The feet 122 may contact the rails 112 via journal bearings of low friction material (e.g., nylon-6,6), or may incorporate ball or roller bearings (not shown). The feet 122 include flanges 123 for maintaining the platform 110 aligned with the rails 112. Generally, and as further discussed below with reference to FIGS. 3A-5C, the sliding connection of the feet 122 onto the rails 112 allows for lateral displacement of the platform 110 along the rails.

Within the body 120 of the platform 110, a collar 124 (e.g., a rotary coupling such as a combination thrust and sleeve bearing, or a conical bearing, etc.) supports a neck 126 on which the receptacle 102 is mounted. Generally, and as further discussed below with reference to FIGS. 3A-5C, the collar 124 allows for swiveling or pivotal motion of the neck 126 and of the receptacle 102 around a working axis that extends generally orthogonal to the direction of lateral motion of the platform 110 along the rails 112.

At the "back" end of the platform 110, i.e., the end that is proximate the closed end of the receptacle 102, two ears 128 protrude rearward. Each of the ears 128 supports a return actuator 130, which extends generally laterally (i.e., along the same direction as the motion of the platform 110 along the rails 112) inward (i.e., toward a lateral midline of the receptacle 102) to a yoke 132. The yoke 132 slidingly rotatably connects the two return actuators 130 to a pin 134 that is rigidly attached to the receptacle 102. Generally, and as further discussed below with reference to FIGS. 3A-5C, the return actuators 130 and the yoke 132 work with the pin 134 to return the receptacle 102 toward an angular centered "rest position" on the rotary connection of the receptacle to the platform 110. In embodiments, the return actuators 130 may be hydraulic, coil, pneumatic, magnetic, or any other sort of conventional "passive" spring elements. In embodiments, the return actuators 130 may also incorporate "active" elements such as, e.g., solenoids, in which case, swiveling motion of the receptacle 102 may be controlled by operation of the return actuators 130. The platform 110 may also mount a return actuator (not shown) that is connected between the platform and an end-piece 135 of the rail 112 for returning the platform itself toward a laterally centered "rest position" on the sliding connection of the platform to the rail or rails 112.

On at least one side of the box-shaped main portion 114, the receptacle 102 includes a latch module 136 that can protrude and retract a latch 138 into and out of the receptacle 102. Generally and as further discussed below with reference to FIGS. 2A-5C, the latch 138 engages with a battery latch feature 338 in order to secure the battery 300 into receptacle 102 and to maintain engagement of the battery 300 onto the recharge connector 104 as the receptacle 102 may move about. For clarity of illustration in FIG. 1 the latch module 136 and latch 138 are shown atop the receptacle 102, and for clarity of illustration in FIG. 6 the latch receptacle 338 is shown atop the battery casing 301. However, latches 138 may be equally effective if placed laterally alongside the receptacle 102, as shown for example in FIGS. 2A-5C. Additionally, a single latch module 136 may control multiple latches 138 via mechanical linkages or the like. The latch module 136 may be operatively connected with the recharge connector 104 to secure the battery 300 into the receptacle 102 in response to a power connector 304 of the battery engaging with the recharge connector 104 of the receptacle. For example, the latch module 136 may be activated by a flow of power through the recharge connector 104 to a battery's power connector 304. Also, or alternatively, the latch module 136 may be disposed to secure the battery 300 into the receptacle 102 in response to the battery reaching a fully installed position.

In embodiments, the battery exchange apparatus 100 is positioned at a wayside location of a vehicle route, e.g., it may be positioned at a designated battery changing/charging station in a mine or other location. For example, the one or more rails 112 may be connected to a support surface of a wayside battery exchange station. Additionally, generally, a base of the battery exchange apparatus 100 on which the receptacle moves (e.g., the rails 112) is stationary relative to a vehicle route.

In normal operation, as shown in FIGS. 2A-2D, a stored energy vehicle 200 approaches the battery exchange apparatus 100 to bring the battery 300, installed on the stored energy vehicle, into alignment with the receptacle 102. The stored energy vehicle 200 includes a battery interface apparatus 201, which includes a platform 202 on which is mounted a vehicle recharge connector 204. ("Platform" generally refers to a member for at least supporting the connector 204, but may also include features (in addition to the connector) for engaging a battery and/or for supporting a battery. In one embodiment, the platform includes a tray on which a battery rests.) The platform 202 is movable inward and outward, with reference to the vehicle, by a plunger 210, which may be rigidly mounted into the vehicle at an inward end and has its outward end supporting the platform. A flexible energy transfer connector 206 (e.g., one or more flexible conduits, cables, or hoses) operatively connects the vehicle recharge connector 204 with the vehicle's power system, not shown in detail. The vehicle 200 also includes latches 238 for securing the battery 300 into the vehicle. In many embodiments, the vehicle latches 238 are positioned similarly as are the latches 138 of the battery exchange apparatus 100, and engage into the same latch features 338 of the battery 300. In other words, the vehicle latch or latches 238 may be disposed adjacent a stroke path of the plunger 210, so that as the plunger is fully retracted with the battery 300 seated onto the recharge connector 204, then the latches 238 can engage into the battery latch features 338.

Figure 6:
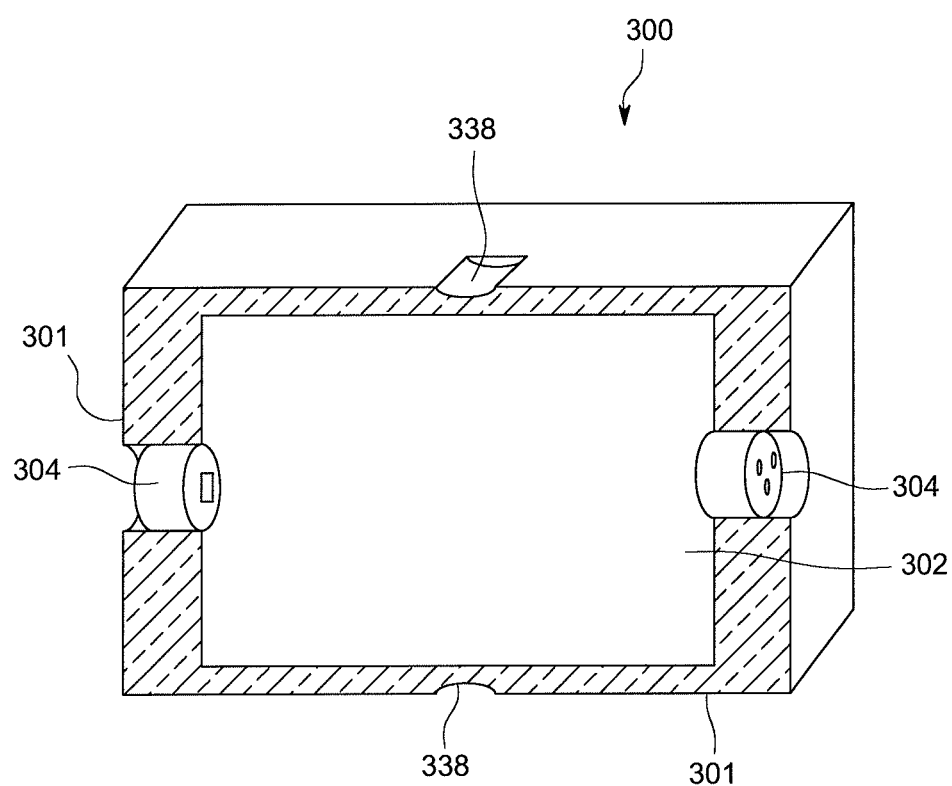
FIG. 6 is a perspective sectioned schematic view of a battery according to an embodiment of the invention.

Referring to FIG. 6, in an embodiment the battery 300 has a casing 301 that contains energy storage media 302, e.g., electrolytes/anodes/cathodes or other electro-chemical cells, capacitor laminates, compressed fluid, etc. The casing 301 is formed/shaped as an orthogonal prism (i.e., it is a rectangular solid or otherwise orthogonal polyhedral in shape) or cylinder having first and second opposed and congruent ends joined by at least one side that extends parallel to a line between the ends. The battery 300 has a battery power connector 304 formed in and/or on each end of the casing 301, e.g., a first power connector 304 at a first end of the casing, and a second power connector at a second end of the casing, opposite the first end. Each of the battery power connectors 304 is fully operable to charge and discharge the battery 300, meaning each of the battery power connectors includes all fittings, contacts, or the like that are needed for transferring energy through the casing 301 to and from the energy storage media 302, and each of which is sized to handle, in normal operation, the entirety of the electrical power/current that the battery outputs for powering a vehicle and that is required to charge the battery. As examples, in cases where the battery 300 is a pneumatic cylinder, each battery power connector 304 may include a quick-disconnect fitting or the like that is connected through the casing 301 to the (compressed air) energy storage media 302; in cases where the battery 300 is an electrolytic capacitor, each battery power connector 304 may include positive and negative electrodes that are connected through the casing 301 to the (electrolyte reactants) energy storage media 302; and in cases where the battery includes plural electrochemical cells, each battery power connector may include positive and negative terminals that connect to positive and negative busses within the casing, which interconnect the cells in parallel and/or series. In embodiments the battery power connectors are identically compatible with the recharge connector 104 and with the vehicle recharge connector 204, so that the battery may be rotated end-for-end and still be compatible both with the battery exchange apparatus 100 and with the vehicle 200. In some embodiments, the battery power connectors 304 may differ in shape. In the drawing figures, the battery power connectors 304 are shown schematically. The battery 300 also has at least one battery latch feature 338, which is configured and positioned to receive the vehicle latch 238 when the battery 300 is installed into the vehicle 200, and to receive the battery exchange apparatus latch 138 when the battery is installed into the battery exchange apparatus 100.

Referring back to FIG. 2A, a process of battery exchange begins by releasing the vehicle latches 238 to permit ejection of the battery 300 from the vehicle 200 into the battery exchange apparatus 100, specifically, into the open end 116 of the receptacle 102, via an ejection mechanism, e.g., the plunger 210. The process continues by partly extending the plunger 210 in order to confirm the vehicles latches 238 have released, e.g., by monitoring displacement of the platform 202 and comparing the monitored displacement to ordered extension of the plunger 210. In case the monitored displacement falls short of the ordered extension by more than a small margin, then the process is halted and an operator may be alerted to the shortfall of monitored displacement from ordered extension.

Figure 2A:
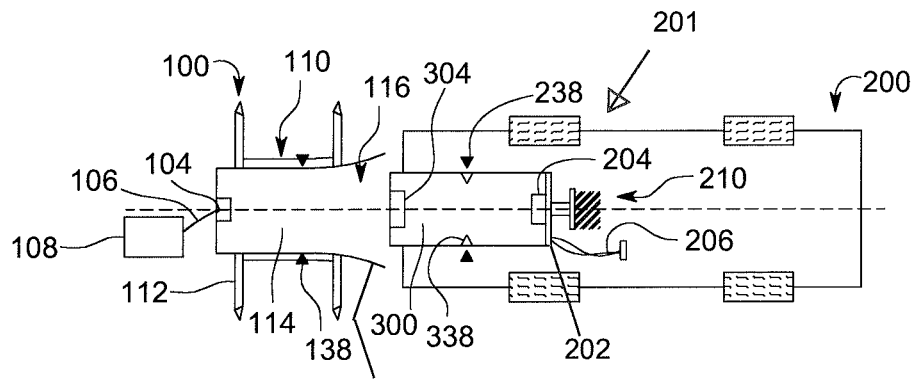
FIGS. 2A-2D are sequential schematic views of the battery exchange apparatus of FIG. 1, accepting a battery from a stored energy vehicle in normal operation according to an embodiment of the invention.
Figure 2B:
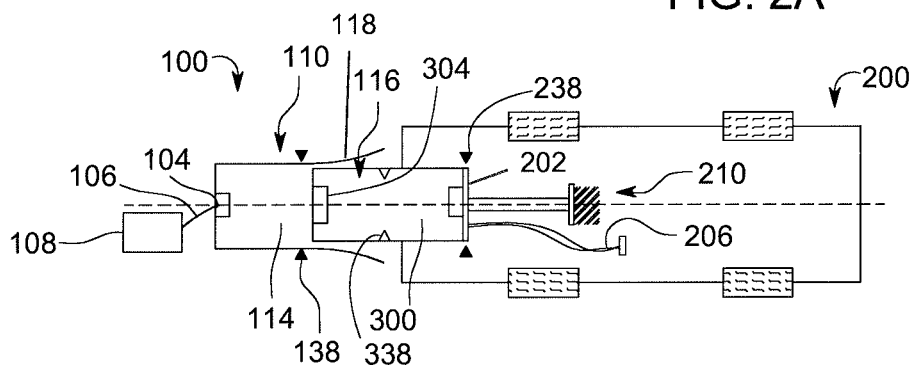

Referring to FIG. 2B, the process of battery exchange continues by further extending the plunger 210 so as to bring a vehicle-rearward end of the battery 300 into contact with the laterally flared surfaces 118 disposed near the open end 116 of the battery receptacle 102. The battery 300 may have rounded vertical edges, which smoothly engage the flared surfaces 118 to guide the battery along the lateral midline of the receptacle 102.

Figure 2C:
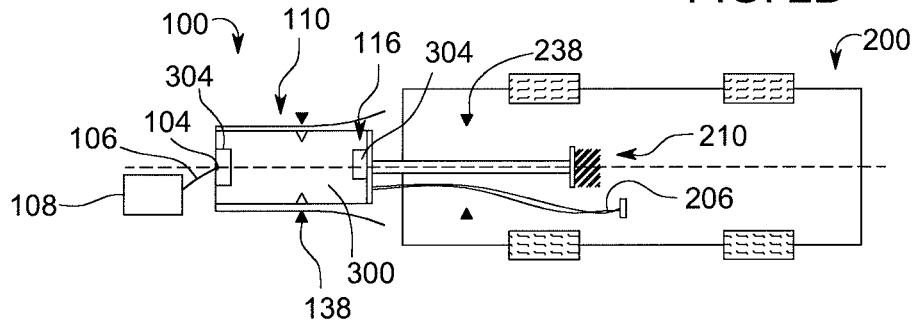
Figure 2D:
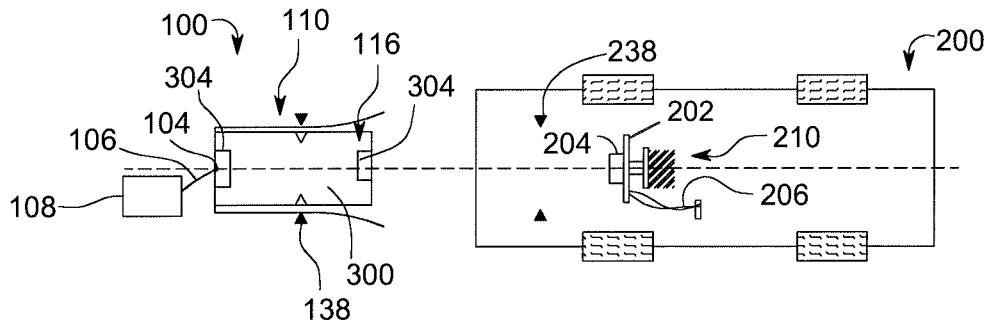

As shown in FIG. 2C, the plunger 210 is then fully extended to seat the battery power connector 304 onto the recharge connector 104. The latches 138 then are engaged into the battery latch features 338. FIG. 2D shows an optional step of retracting the plunger 210 into the vehicle 200, thereby removing the vehicle recharge connector 204 from the battery power connector 304. In some embodiments of the invention, however, the battery 300 may incorporate a power pass through feature. Here, a first portion of power supplied from the recharge connector 104 through one of the battery power connectors 304 may replenish the energy storage media 302, while a complementary second portion of power supplied from the recharge connector 104 may bypass the energy storage media 302 and flow to the vehicle 200 via the other of the battery power connectors 304 and the vehicle recharge connector 204. In such embodiments, the step of retracting the plunger may be omitted.

Figure 3A:
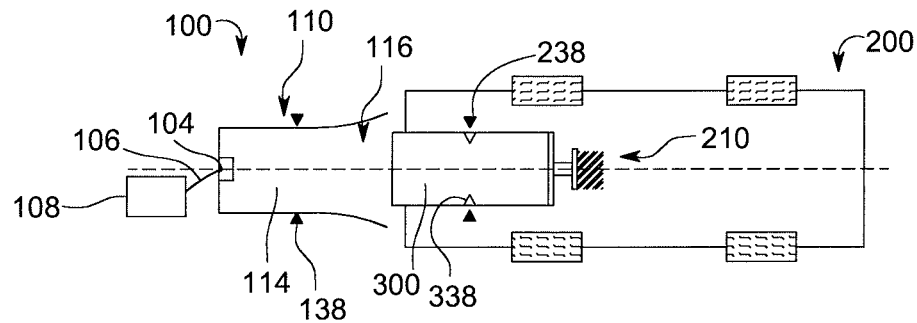
FIGS. 3A-3D are sequential schematic views of the battery exchange apparatus of FIG. 1, accepting a battery from a stored energy vehicle in lateral misalignment according to an embodiment of the invention.
Figure 3B:
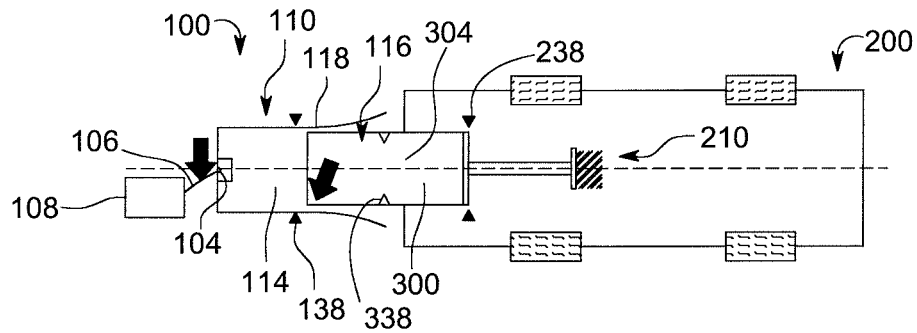
Figure 3C:
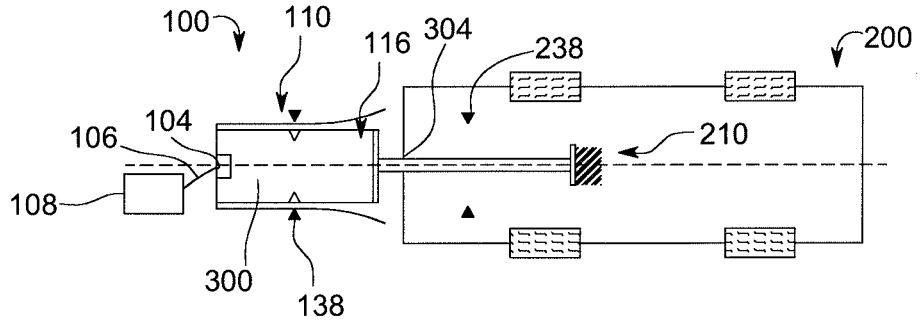
Figure 3D:
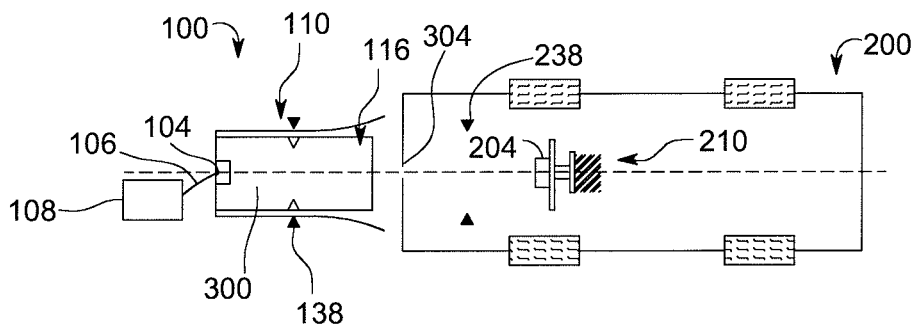

Advantageously, as shown in FIGS. 3A-3D, the laterally flared surfaces 118 and the battery (e.g., via rounded edges) can interact with the platform 110 and the rails 112 to accommodate lateral misalignment of the vehicle 200 and the battery 300 offset from the lateral midline of the battery exchange receptacle 102. In FIG. 3A, the vehicle 200 approaches the battery exchange apparatus 100 along a line parallel to and offset from the lateral midline of the battery receptacle 102. In FIG. 3B, extending the plunger 210 causes the battery to contact one of the laterally flared surfaces 118, thereby exerting a reaction force that causes the battery receptacle 102 to slide on its platform 110 along the rails 112. In FIG. 3C, as the battery receptacle 102 has self-aligned to accept the laterally offset battery 300, the plunger 210 has been fully extended to seat the battery power connector 304 onto the recharge connector 104. FIG. 3D shows an optional step of retracting the plunger 210, thereby disengaging the vehicle recharge connector 204 from the battery power connector 304 so that the vehicle 200 can move away from the battery exchange apparatus 100.

Referring now to FIGS. 4A-5C, embodiments of the inventive battery exchange apparatus 100 have a further advantage of being able to receive a battery 300 that is both angularly and/or laterally misaligned to the lateral midline of the battery receptacle 102.

Figure 4A:
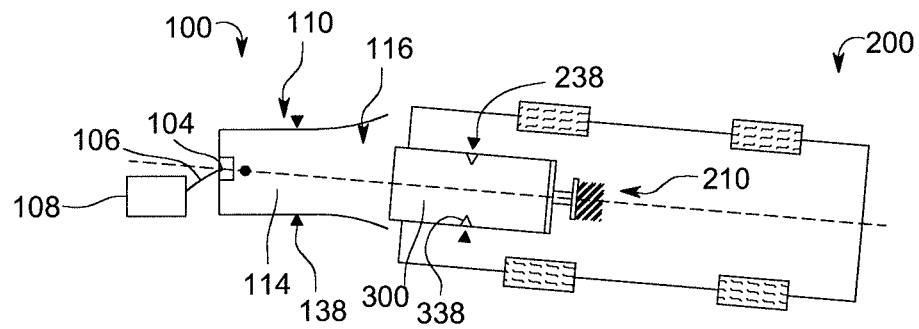
FIGS. 4A-4D are sequential schematic views of the battery exchange apparatus of FIG. 1, accepting a battery from a stored energy vehicle in angular misalignment according to an embodiment of the invention.
Figure 4B:
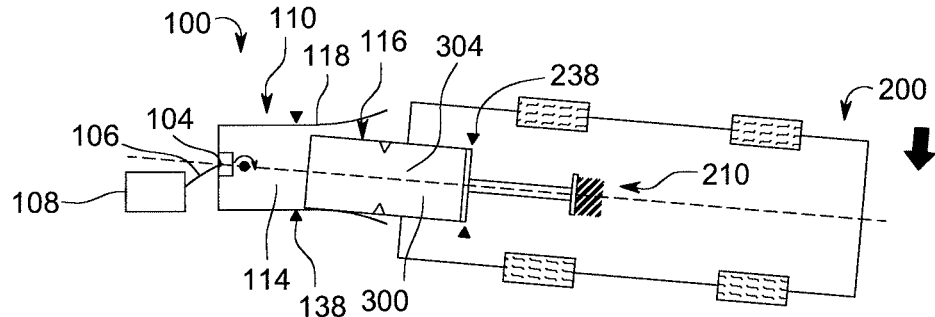
Figure 4C:
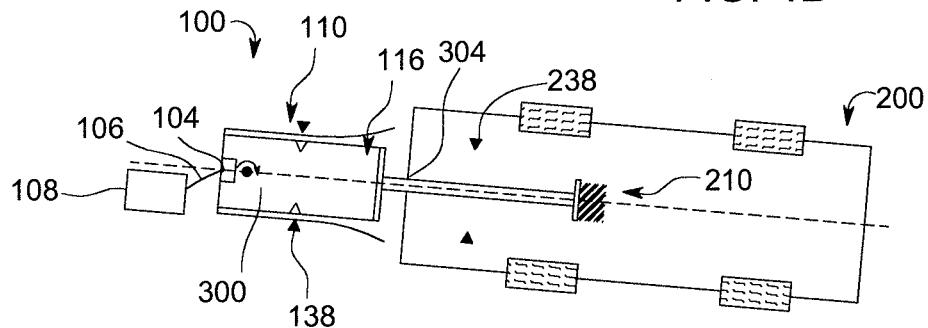
Figure 4D:
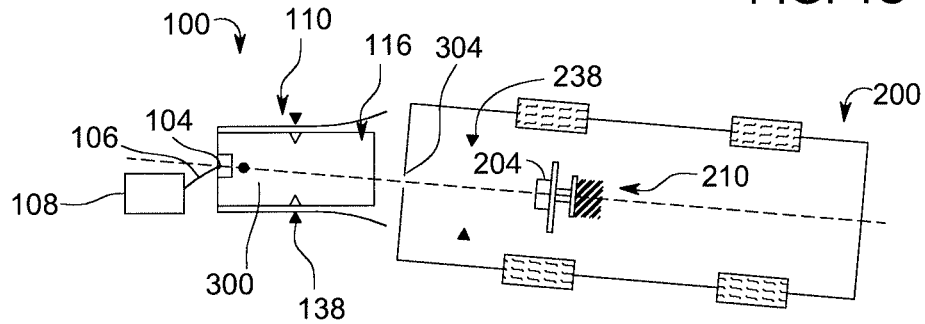

In FIG. 4A the vehicle 200 is shown approaching the battery exchange apparatus along a direction that is angled off the lateral midline of the battery receptacle 102, but that extends through the working axis of the battery exchange apparatus 100. At FIG. 4B, the reaction force of the battery against the laterally flared surface 118 has induced pivoting of the battery receptacle 102 to accommodate the angular misalignment of the battery 300. At FIG. 4C the plunger 210 has been fully extended to engage the battery power connector 304 onto the recharge connector 104. FIG. 4D shows the optional steps of retracting the battery plunger 210 and moving the vehicle 200 away from the battery exchange apparatus 100.

Figure 5A:
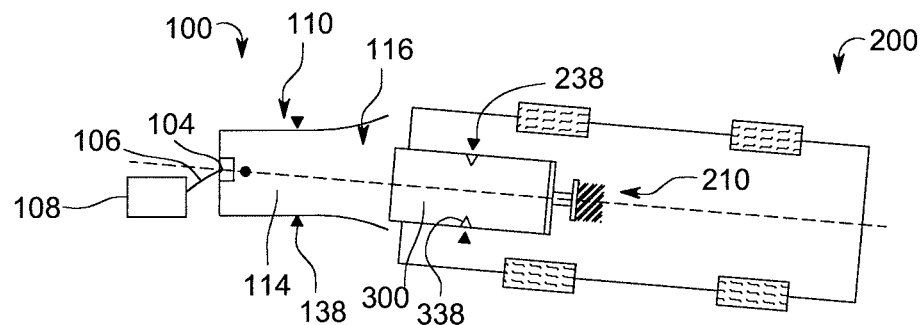
FIGS. 5A-5C are sequential schematic views of the battery exchange apparatus of FIG. 1, accepting a battery from a stored energy vehicle in lateral and angular misalignment according to an embodiment of the invention.
Figure 5B:
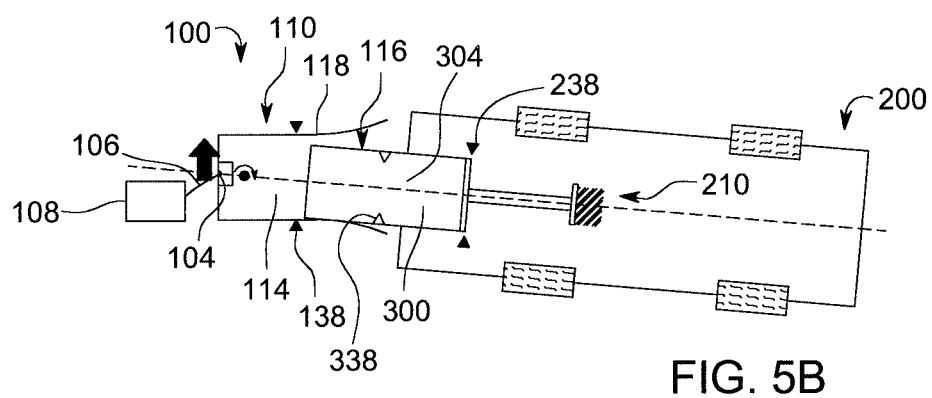
Figure 5C:
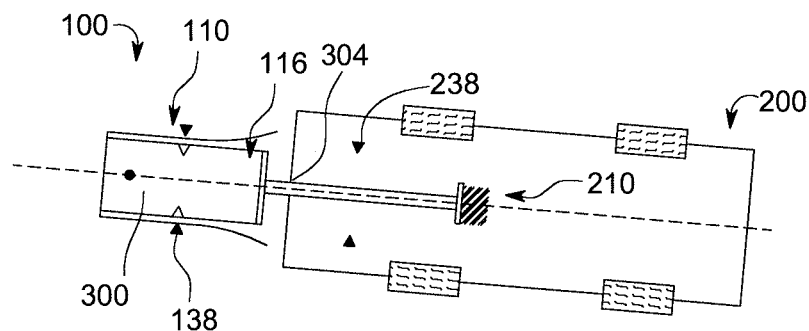

At FIG. 5A the vehicle 200 is shown approaching the battery exchange apparatus along a direction that is both angled off the lateral midline of the battery receptacle 102, and also offset from the working axis of the battery exchange apparatus 100. At FIG. 5B the reaction force of the battery against the laterally flared surface 118 has induced pivoting of the battery receptacle 102 around the working axis, along with sliding motion of the battery receptacle 102 along the rails 112, in order to accommodate the angular misalignment of the battery 300. At FIG. 5C the plunger 210 has been fully extended to engage the battery power connector 304 onto the recharge connector 104.

Figure 7:
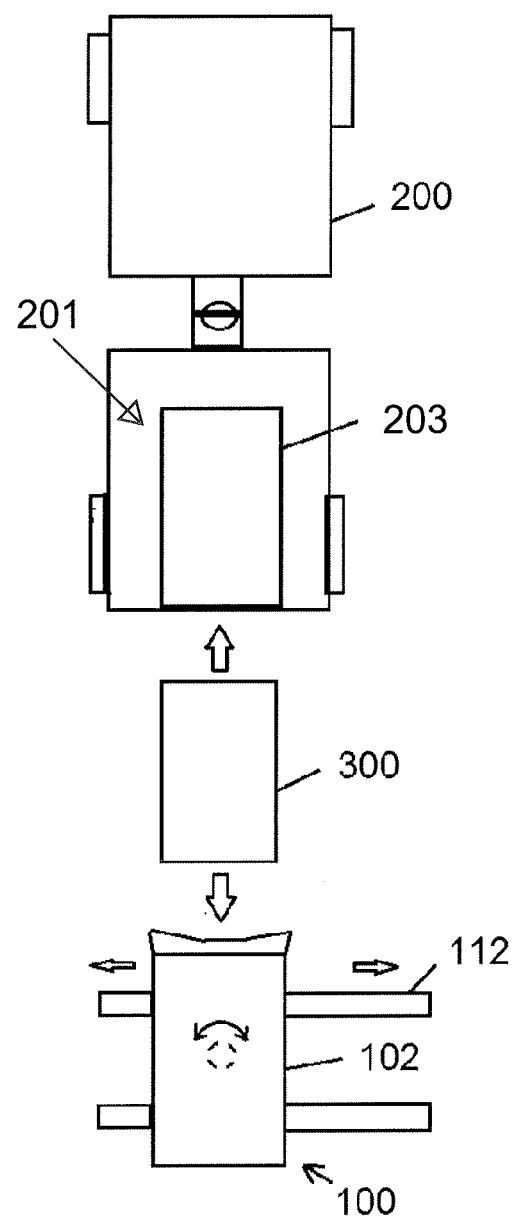
FIG. 7 is a top plan schematic view of embodiments of a battery exchange system.

With reference to FIG. 7, embodiments of the invention relate to a battery exchange system that may include one or more of: a battery interface apparatus 201 for a vehicle (e.g., as shown in FIGS. 2A-5C); a vehicle battery 300 (e.g., as shown in any of FIGS. 2A-6); and/or a wayside battery exchange apparatus 100 (e.g., as shown in any of FIGS. 1-5C). In one embodiment, a battery exchange system includes the battery interface apparatus 201, the vehicle battery 300, and the wayside battery exchange apparatus 100.

Embodiments of the invention provide a battery exchange method, which includes laterally ejecting a depleted or partially-depleted battery (i.e., the battery is ejected out from a side of the vehicle, as opposed to, for example, removing the battery in an upwards or downwards direction) from a stored energy vehicle via an ejection mechanism, and guiding a moveable receptacle of a battery exchange apparatus into position to receive the battery. (A base of the battery exchange apparatus on which the receptacle moves is stationary relative to a vehicle route.) The method further includes accepting the battery into the receptacle. The battery and/or are configured such that by ejecting the battery, the receptacle of the battery exchange apparatus is mechanically guided into position to receive the battery. For example, the battery exchange apparatus may be mechanically guided by contacting the battery against a flared surface of the battery exchange apparatus. The battery exchange method also may include engaging a power connector of the battery onto a recharge connector of the battery exchange apparatus. For example, the power connector of the battery may be engaged onto the recharge connector of the battery exchange apparatus by accepting the battery into the battery exchange apparatus. The battery exchange method also may include securing the battery into the battery exchange apparatus. For example, the battery may be secured into the battery exchange apparatus by extending a latch into a receptacle of the apparatus to mechanically engage the battery. As another example, the battery may be secured into the apparatus in response to engaging a power connector of the battery onto a recharge connector of the battery exchange apparatus.

In an embodiment, a battery exchange apparatus (e.g., for a battery exchange station positioned at a wayside location of a vehicle route) includes a receptacle mounted to at least one rail for lateral movement along the rail and for pivotal movement around a working axis generally orthogonal to the rail. (The rail may be attached to a stationary surface, e.g., to a support surface of a vehicle battery exchange station.) The receptacle has an open end for receiving a battery from a direction generally orthogonal to the working axis. The apparatus further includes a recharge connector provided within the receptacle and opposite the open end of the receptacle. The open end of the receptacle includes at least two laterally flared surfaces, which are configured to impose at least one of lateral motion or pivotal motion on the receptacle in order to align the receptacle to the battery that is at least one of laterally or angularly misaligned from a lateral midline of the receptacle.

In an embodiment, the receptacle is mounted to the rail by way of a platform that has a rotary connection to the receptacle and has a sliding connection to the rail. The platform may include a return actuator for at least one of moving the receptacle to a rest position on the rotary connection or moving the platform to a rest position on the rail.

In an embodiment, the recharge connector is supplied with power by a flexible energy transfer connector from a power source.

In an embodiment, the battery exchange apparatus further includes a latch module operable to extend a latch to secure the battery into the receptacle. The latch module may be operatively connected with the recharge connector to secure the battery into the receptacle in response to a power connector of the battery engaging with the recharge connector of the receptacle. Additionally or alternatively, the latch module may be disposed to secure the battery into the receptacle in response to the battery reaching a fully installed position.

In an embodiment, a vehicle battery includes a casing that is formed as an orthogonal prism or cylinder having first and second opposed and congruent ends joined by at least one side that extends parallel to a line between the ends. The vehicle battery further includes energy storage media housed in the casing, a first power connector attached to the first end of the casing and fully operable to receive power to charge and discharge the battery, and a second power connector attached to the second end of the casing and fully operable to receive power to charge and discharge the battery independent of the first power connector. The first and second power connectors may be identical, e.g., as seen from their respective first and second ends of the casing. The first and second power connectors may be indented plug connectors, for example.

In an embodiment, the battery further includes a power pass through feature that selectively bypasses around the energy storage media to the second power connector a portion of power that is supplied into the first power connector.

In an embodiment, the energy storage media is configured to hold energy at least sufficient to move a vehicle carrying multiple humans along a route. This reflects that the battery may be relatively large sized and have a relatively large capacity.

In an embodiment, a system (e.g., a battery exchange system) includes a battery interface apparatus for a vehicle, which includes a compartment attached to the vehicle (see compartment 203 in FIG. 7), and a plunger that has a proximal end that is mounted in the compartment, and a distal end that is configured to be actuated to protrude away from the proximal end and that is configured to be actuated to retract toward the proximal end. The battery interface apparatus further includes a platform that is mounted to the distal end of the plunger, a first recharge connector that is mounted on or into the platform (the first recharge connector includes charging connections facing away from the plunger), a flexible power connector that is connected from the first recharge connector to the vehicle for transferring power from the first recharge connector to the vehicle, and a latch that is mounted in the vehicle adjacent a stroke path of the plunger, and which is operable to engage into a latch of a battery that is carried by the platform and operably connected to the first recharge connector.

In an embodiment, a system (e.g., a battery exchange system) includes vehicle battery and a battery interface apparatus for a vehicle. The interface includes a compartment attached to the vehicle, and a plunger that has a proximal end that is mounted in the compartment, and a distal end that is configured to be actuated to protrude away from the proximal end and that is configured to be actuated to retract toward the proximal end. The battery interface apparatus further includes a platform that is mounted to the distal end of the plunger, a first recharge connector that is mounted on or into the platform (the first recharge connector includes charging connections facing away from the plunger), a flexible power connector that is connected from the first recharge connector to the vehicle for transferring power from the first recharge connector to the vehicle, and a latch that is mounted in the vehicle adjacent a stroke path of the plunger, and which is operable to engage into a latch of a battery that is carried by the platform and operably connected to the first recharge connector. The battery includes a casing that is formed as an orthogonal prism or cylinder having first and second opposed and congruent ends joined by at least one side that extends parallel to a line between the ends, the casing configured to fit in the compartment. The battery further includes energy storage media housed in the casing, a first power connector attached to the first end of the casing, and fully operable to receive power to charge and discharge the battery, and a second power connector attached to the second end of the casing, and fully operable to receive power to charge and discharge the battery independent of the first power connector. At least one of the first power connector or the second power connector is configured to operably engage the first recharge connector of the battery interface apparatus.

In an embodiment, a system (e.g., a battery exchange system) includes vehicle battery, a battery interface apparatus for a vehicle, and a wayside battery exchange apparatus. The interface includes a compartment attached to the vehicle, and a plunger that has a proximal end that is mounted in the compartment, and a distal end that is configured to be actuated to protrude away from the proximal end and that is configured to be actuated to retract toward the proximal end. The battery interface apparatus further includes a platform that is mounted to the distal end of the plunger, a first recharge connector that is mounted on or into the platform (the first recharge connector includes charging connections facing away from the plunger), a flexible power connector that is connected from the first recharge connector to the vehicle for transferring power from the first recharge connector to the vehicle, and a latch that is mounted in the vehicle adjacent a stroke path of the plunger, and which is operable to engage into a latch of a battery that is carried by the platform and operably connected to the first recharge connector. The battery includes a casing that is formed as an orthogonal prism or cylinder having first and second opposed and congruent ends joined by at least one side that extends parallel to a line between the ends, the casing configured to fit in the compartment. The battery further includes energy storage media housed in the casing, a first power connector attached to the first end of the casing, and fully operable to receive power to charge and discharge the battery, and a second power connector attached to the second end of the casing, and fully operable to receive power to charge and discharge the battery independent of the first power connector. At least one of the first power connector or the second power connector is configured to operably engage the first recharge connector of the battery interface apparatus. The wayside battery exchange apparatus includes a receptacle mounted to at least one rail for lateral movement along the rail and for pivotal movement around a working axis generally orthogonal to the rail, the receptacle having an open end for receiving the battery from a direction generally orthogonal to the working axis. The wayside battery exchange apparatus also includes a second recharge connector provided within the receptacle and opposite the open end of the receptacle. The open end of the receptacle includes at least two laterally flared surfaces, which are configured to impose at least one of lateral motion or pivotal motion on the receptacle in order to align the receptacle to the battery that is at least one of laterally or angularly misaligned from a lateral midline of the receptacle. The second recharge connector is configured to operably engage at least one of the first power connector or the second power connector of the battery.

In an embodiment, a system (e.g., a battery exchange system) includes a battery interface apparatus for a vehicle and a wayside battery exchange apparatus. The battery interface apparatus includes a compartment attached to the vehicle, and a plunger that has a proximal end that is mounted in the compartment, and a distal end that is configured to be actuated to protrude away from the proximal end and that is configured to be actuated to retract toward the proximal end. The battery interface apparatus further includes a platform that is mounted to the distal end of the plunger, a first recharge connector that is mounted on or into the platform (the first recharge connector includes charging connections facing away from the plunger), a flexible power connector that is connected from the first recharge connector to the vehicle for transferring power from the first recharge connector to the vehicle, and a latch that is mounted in the vehicle adjacent a stroke path of the plunger, and which is operable to engage into a latch of a battery that is carried by the platform and operably connected to the first recharge connector. The wayside battery exchange apparatus includes a receptacle mounted to at least one rail for lateral movement along the rail and for pivotal movement around a working axis generally orthogonal to the rail, the receptacle having an open end for receiving the battery from a direction generally orthogonal to the working axis. The wayside battery exchange apparatus also includes a second recharge connector provided within the receptacle and opposite the open end of the receptacle. The open end of the receptacle include at least two laterally flared surfaces, which are configured to impose at least one of lateral motion or pivotal motion on the receptacle in order to align the receptacle to the battery that is at least one of laterally or angularly misaligned from a lateral midline of the receptacle.

In an embodiment, a system (e.g., a battery exchange system) includes a vehicle battery and a wayside battery exchange apparatus. The wayside battery exchange apparatus includes a receptacle mounted to at least one rail for lateral movement along the rail and for pivotal movement around a working axis generally orthogonal to the rail, the receptacle having an open end for receiving the vehicle battery from a direction generally orthogonal to the working axis. The wayside battery exchange apparatus also includes a recharge connector provided within the receptacle and opposite the open end of the receptacle. The open end of the receptacle includes at least two laterally flared surfaces, which are configured to impose at least one of lateral motion or pivotal motion on the receptacle in order to align the receptacle to the battery that is at least one of laterally or angularly misaligned from a lateral midline of the receptacle. The battery includes a casing that is formed as an orthogonal prism or cylinder having first and second opposed and congruent ends joined by at least one side that extends parallel to a line between the ends. The casing is configured to fit in the receptacle. The battery further includes energy storage media housed in the casing, a first power connector attached to the first end of the casing, and fully operable to receive power to charge and discharge the battery, and a second power connector attached to the second end of the casing, and fully operable to receive power to charge and discharge the battery independent of the first power connector. The first power connector and/or the second power connector is configured to operably engage the recharge connector of the wayside battery exchange apparatus. Correspondingly, the recharge connector is configured to operably engage the first power connector and/or the second power connector of the battery.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such climitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems, apparatuses, and methods, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A battery exchange apparatus comprising:
   a receptacle mounted to at least one rail for lateral movement along the rail and for pivotal movement around a working axis generally orthogonal to the rail, the receptacle having an open end for receiving a battery from a direction generally orthogonal to the working axis; and
   a recharge connector provided within the receptacle and opposite the open end of the receptacle;
   wherein the open end of the receptacle includes at least two laterally flared surfaces, which are configured to impose at least one of lateral motion or pivotal motion on the receptacle in order to align the receptacle to the battery that is at least one of laterally or angularly misaligned from a lateral midline of the receptacle.

2. The apparatus of claim 1, wherein the receptacle is mounted to the rail by way of a platform that has a rotary connection to the receptacle and has a sliding connection to the rail.

3. The apparatus of claim 2, wherein the platform includes a return actuator for at least one of moving the receptacle to a rest position on the rotary connection or moving the platform to a rest position on the rail.

4. The apparatus of claim 1, wherein the recharge connector is supplied with power by a flexible energy transfer connector from a power source.

5. The apparatus of claim 1, further comprising a latch module operable to extend a latch to secure the battery into the receptacle.

6. The apparatus of claim 5, wherein the latch module is operatively connected with the recharge connector to secure the battery into the receptacle in response to a power connector of the battery engaging with the recharge connector of the receptacle.

7. The apparatus of claim 5, wherein the latch module is disposed to secure the battery into the receptacle in response to the battery reaching a fully installed position.

8. The apparatus of claim 1, wherein the at least one rail is connected to a support surface of a vehicle battery exchange station for receiving the battery from a vehicle.

9. A battery exchange apparatus comprising:
   a receptacle mounted to at least one rail for lateral movement along the rail and for pivotal movement around a working axis generally orthogonal to the rail, the receptacle having an open end for receiving a battery from a direction generally orthogonal to the working axis;
   a recharge connector provided within the receptacle and opposite the open end of the receptacle; and
   a latch module operable to extend a latch to secure the battery into the receptacle;
   wherein the open end of the receptacle includes at least two laterally flared surfaces, which are configured to impose at least one of lateral motion or pivotal motion on the receptacle in order to align the receptacle to the battery that is at least one of laterally or angularly misaligned from a lateral midline of the receptacle; and
   wherein the receptacle is mounted to the rail by way of a platform that has a rotary connection to the receptacle and has a sliding connection to the rail, the platform including a return actuator for at least one of moving the receptacle to a rest position on the rotary connection or moving the platform to a rest position on the rail.

10. The apparatus of claim 9, wherein the recharge connector is supplied with power by a flexible energy transfer connector from a power source.

11. The apparatus of claim 9, wherein the latch module is operatively connected with the recharge connector to secure the battery into the receptacle in response to a power connector of the battery engaging with the recharge connector of the receptacle.

12. The apparatus of claim 9, wherein the latch module is disposed to secure the battery into the receptacle in response to the battery reaching a fully installed position.

13. The apparatus of claim 9, wherein the at least one rail is connected to a support surface of a vehicle battery exchange station for receiving the battery from a vehicle.

14. A battery exchange apparatus comprising:
   a receptacle mounted to at least one rail for lateral movement along the rail and for pivotal movement around a working axis generally orthogonal to the rail, the receptacle having an open end for receiving a battery from a direction generally orthogonal to the working axis;
   a recharge connector provided within the receptacle and opposite the open end of the receptacle; and
   a latch module operable to extend a latch to secure the battery into the receptacle;
   wherein the open end of the receptacle includes at least two laterally flared surfaces, which are configured to impose at least one of lateral motion or pivotal motion on the receptacle in order to align the receptacle to the battery that is at least one of laterally or angularly misaligned from a lateral midline of the receptacle;
   wherein the receptacle is mounted to the rail by way of a platform that has a rotary connection to the receptacle and has a sliding connection to the rail, the platform including a return actuator for at least one of moving the receptacle to a rest position on the rotary connection or moving the platform to a rest position on the rail;
   wherein the at least one rail is connected to a support surface of a vehicle battery exchange station for receiving the battery from a vehicle;
   wherein the recharge connector is supplied with power by a flexible energy transfer connector from a power source; and
   wherein the latch module is operatively connected with the recharge connector to secure the battery into the receptacle in response to one of a power connector of the battery engaging with the recharge connector of the receptacle, and a flow of power through the recharge connector to the power connector of the battery.

* * * * *